United States Patent [19]

Matsuda

[11] 3,916,988
[45] Nov. 4, 1975

[54] CONTROL MECHANISM FOR AN AIR-CONDITIONED DEVICE IN AUTOMOTIVE VEHICLES

[75] Inventor: Tamotsu Matsuda, Wako, Japan

[73] Assignee: Honda Giken Kogyo Kabushiki Kaisha, Japan

[22] Filed: May 1, 1974

[21] Appl. No.: 465,761

[30] Foreign Application Priority Data

May 14, 1973 Japan.............................. 48-53438

[52] U.S. Cl................. 165/42; 165/96; 237/12.3 B
[51] Int. Cl............................................. B60h 3/04
[58] Field of Search................... 165/13, 23, 42–44, 165/96; 237/12.3 B, 12.3 A

[56] References Cited
UNITED STATES PATENTS

| | | | |
|---|---|---|---|
| 3,428,115 | 2/1969 | Caldwell | 165/23 |
| 3,490,518 | 1/1970 | Herbon | 165/96 X |
| 3,662,818 | 5/1972 | Snyder | 165/42 X |
| 3,802,490 | 4/1974 | Jacobs | 165/23 |
| R27,699 | 12/1964 | Weaver et al. | 165/23 |

Primary Examiner—Albert W. Davis, Jr.
Attorney, Agent, or Firm—Polster and Polster

[57] ABSTRACT

In an air-conditioning device for an automotive vehicles provided with a main air-conditioning and circulating conduit which is connected at one open end thereof with conduits for introducing external and internal air, an air blower, an evaporator or an air-heater, or both, and a plurality of dampers to control flow of external and internal air as well as conditioned air, all being accommodated in the main conduit, and a plurality of outlet ports communicated with the air-conditioning conduit for directing conditioned air to the upper and lower parts of the vehicle cabin, the temperature and blowing quantity of conditioned air are controlled by a single controlling lever integrally formed with a controlling cam mechanism so as to constantly supply the outlet air adapted to the desired conditions to be set by interrelated adjustments of various factors to be controlled, i.e., adjustments in the positional relationship of the dampers, and operations of the evaporator and the air-heater.

2 Claims, 12 Drawing Figures

CONTROL MECHANISM FOR AN AIR-CONDITIONED DEVICE IN AUTOMOTIVE VEHICLES

BACKGROUND OF INVENTION

This invention relates to an air-conditioning device in vehicles such as automobiles, and, more particularly, it is concerned with an improvement in the control mechanism for such air-conditioning device.

The air-conditioning device of this type usually requires complicated controlling operations such as adjustment of inlet ratio by an air blower of air both inside and outside of the vehicle, treatment of the inlet air by an evaporator or an air heater, mixing of heated air and unheated air, distribution of the treated air to both upper part of the vehicle cabin or room in the vicinity of the dash board (or instrument board) as well as the front glass and lower part thereof close to the feet of the riders, adjustment of the distributing quantity of the temperature-conditioned air to the upper and lower ducts according to its temperature level, and so forth.

SUMMARY OF INVENTION

It is an object of the present invention to provide an improved controlling mechanism for such air-conditioning device, in which the temperature, blowing quantity, etc. of the conditioned air in every part of the vehicle cabin are constantly maintained in the optimum condition by ingeniously controlling the abovementioned various factors to be controlled in an interrelated manner.

It is another object of the present invention to provide an improved controlling mechanism for the air-conditioning device, in which the above-mentioned various factors are controlled interrelatedly by a single common controlling member.

It is still another object of the present invention to provide an improved controlling mechanism for the air-conditioning device in vehicles, wherein all the factors to be controlled, except for ones which do not cause any practical inconvenience or trouble, are interconnected by a common controlling member so as to obtain appropriate conditioning effect in the vehicle cabin.

It is other object of the present invention to provide the controlling mechanism for the air-conditioning device of a construction, wherein the abovementioned composite interconnected controlling mechanism is made by a simple cam mechanism, thereby securing smooth controlling operations, increasing durability of the controlling mechanism, and reducing the manufacturing cost to the minimum possible.

The foregoing objects of the present invention and the detailed functions and operations of the principal component parts of the mechanism will become clearly understandable from the following detailed description, when read in conjunction with the accompanying drawing.

DETAILED DESCRIPTION OF INVENTION

Figure 1:
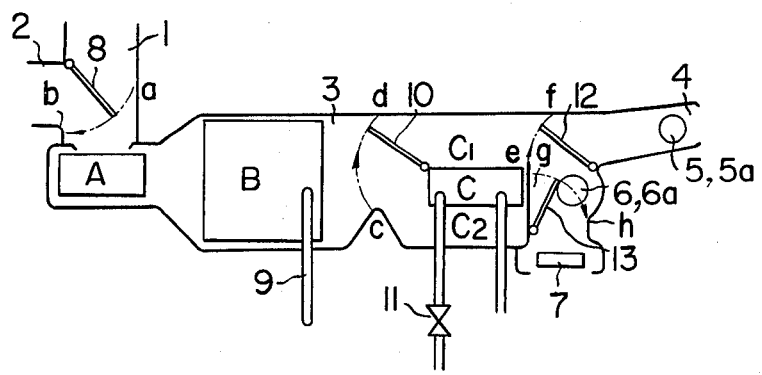
FIG. 1 is a side view showing a general construction of an ordinary air-conditioning device for motor vehicles.

A general construction of the air-conditioning device for automotive vehicles is as shown in FIG. 1, which comprises a first conduit 1 for taking external air into the vehicle cabin (or more specifically an air-conditioning area in the device), a second conduit 2 for introducing internal air in the vehicle cabin and conjoined with the first conduit 1 at one open end part of each of them, a third conduit 3 connected at its one open end part to the conjoined open and part of the abovementioned first and second conduits for conditioning and circulation of sucked and conditioned air into every part of the vehicle cabin, an air blower or ventilator A, an evaporator B for cooling, an air-heater C for warming, all of these three components being accommodated within the third conduit 3, an outlet 4 provided at the other open end part of the third conduit 3 for directing conditioned air toward the center part of the dash board of the vehicle, outlets 5, 5a also provided near the outlet 4 to direct the conditioned air to both left and right sides in the front part of the vehicle cabin, other outlets 6, 6 a provided backward of the abovementioned outlets 4, 5, 5a to direct the conditioned air to the defroster, still another outlet 7 provided below the outlets 6, 6a to direct the air to the feet of the rider, a change-over damper 8 for the external and internal air provided at the conjoined portion of the first and second conduits 1, 2, a distributing damper 10 to cause air from the evaporator B or the introduced air from both exterior and interior of the vehicle to be directly sent into an air conditioning chamber $C_1$ defined above the air heater C within the third conduit 3, or to pass once through a re-heating passage $C_2$ defined below the heater C and then to be sent into the air conditioning chamber $C_1$, another distributing damper 12 to cause the conditioned air forwarded from the air-conditioning chamber $C_2$ to be divided into the upper outlets 4, 5, and 5a and the lower outlets 6, 6a and 7, and still other damper to regulate the quantity of the conditional air to the outlet 7 for the riders feet and the outlets 6, 6a for the defroster.

Incidentally, the evaporator B is actuated by a controlling thermocouple 9 which causes a power source for a magnet switch of a compressor to become "on" and "off", and the air heater C is operated by feeding thereinto and circulating therethrough of warm water which is regulated by a warm water valve 11 in a continuous or intermittent manner.

Figure 2:
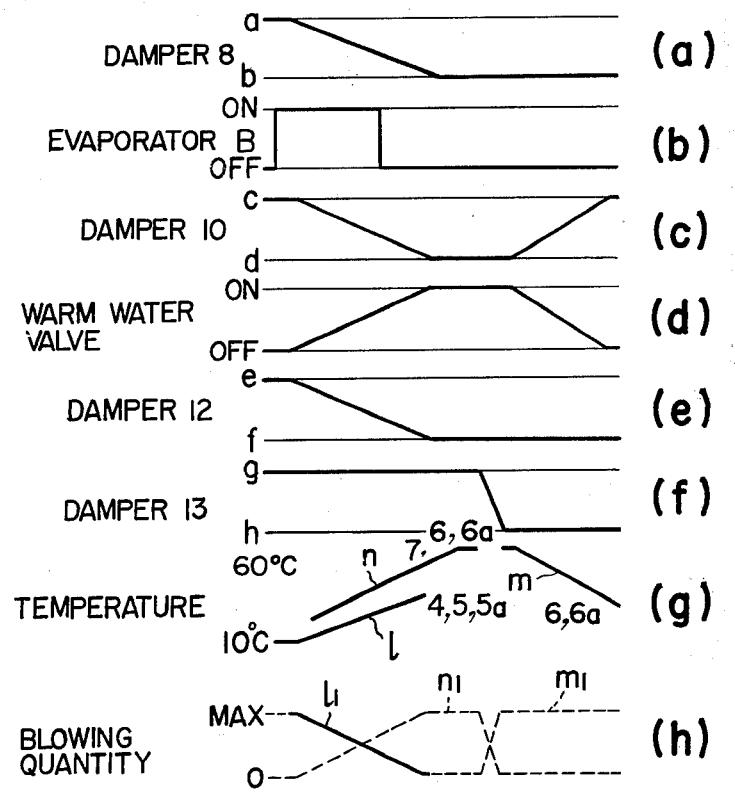
FIGS. 2($a$) through 2($h$) respectively show various controlling patterns of factors to control temperature and blowing quantity of air to exit from the air-conditioning device.

Now, it will be apparent from FIG. 2 that, in the foregoing example of the air-conditioning device of the general construction, controlling of the temperature and quantity of the conditioned air to each of the outlets is done by intricate adjustments of the six factors to be adjusted, i.e., adjustment of the dampers 8, 10, 12, and 13; on-off operations of the evaporator B by the thermocouple 9, and opening closing and adjusting operations of the water valve 11 for the air-heater C.

Each of these six controlling operations have heretofore been done independently or in combination of certain components, so that the operations are very difficult and no appropriate use of the device can be achieved not infrequently.

In view of such defect inherent in the conventional device, the present invention has contemplated to interconnect the operations of the abovementioned six factors so that the whole operations of the device may be done by a single controlling lever, as the result of which the optimum conditioned air can always be sent to every part of the vehicle cabin. It is of course possible in this case that all the six factors to be controlled are entirely interconnected, or only those factors of practical significance are combined for the interrelated control operations by the single controlling lever.

Figure 3:
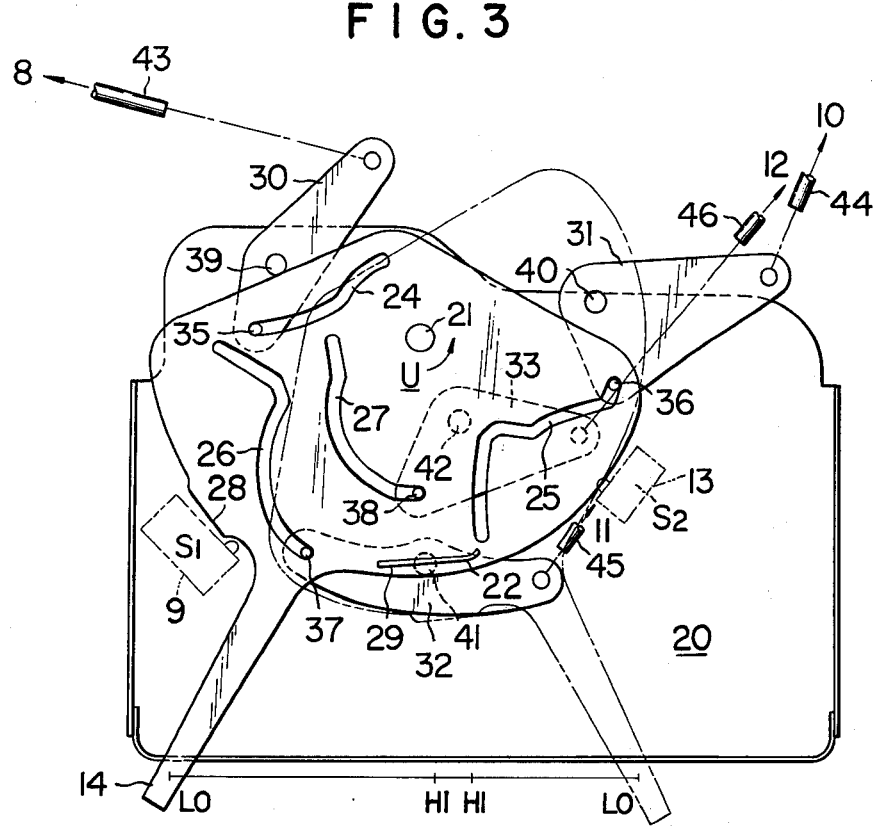
FIG. 3 is a plan view showing one actual embodiment of the interconnected controlling mechanism to be operated by a common, single controlling member according to the present invention.

Referring now to FIG. 3 which shows one embodiment of the control mechanism according to the present invention, a cam plate 22 is rotatably fitted on the axis 21 at a base plate 20. A controlling lever 14 is formed at an extension from this cam plate 22. Grooves 24, 25, 26, and 27, a cam face 28 for actuating switch $S_1$ of the evaporator B, and another cam face 29 to act on the switch $S_2$ for operating the damper 13 are provided on the cam plate 22. A plurality of levers 30, 31, 32, and 33 are pivotally fitted on the base plate 20 by way of axes 39, 40, 41, and 42, respectively, and pins 35, 36, 37 and 38 fixed on each of the levers are engaged with the abovementioned cam grooves 24, 25, 26, and 27, respectively. The lever 30 is connected to the damper 8 by means of a connecting member 43 which may be either rod or wire, the lever 31 to the distributing damper 10 by the connecting member 44 of the same material as that used above, the lever 32 to the warm water valve 11 by the connecting member 45, and lever 33 to the distributing damper 12 by the connecting member 46.

In the above-described combined structure of the cam groove 24 to 27, cam faces 28 and 29, and the actuating levers 40 to 43 which are all designed in accordance with the intended operations, the following operations can be effected.

Figure 4:
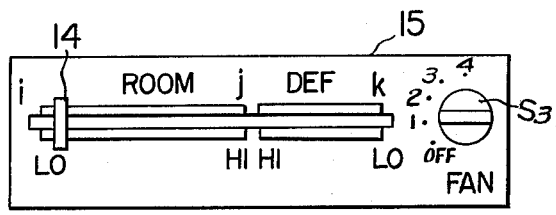
FIG. 4 is a front view showing one example of an indicator panel for the controlling member shown in FIG. 3.

That is, when a starting switch $S_3$ for the air blower or ventilator A as shown in FIG. 4 is brought to an on position to operate the same, and then the controlling lever 14 is moved to the direction of from the position $i$ to the position $j$ for the vehicle cabin or room, and from the position $j$ to the position $k$ for the defroster in accordance with the indicator panel 15, the cam plate 22 rotates in the arrow direction U, whereby the damper 8 changes its position at $a$ for the intake of the internal air alone over to a position $b$ for the intake of the external air alone by the interconnected movement of the cam groove 24, the pin 35, the lever 30, and the connecting member 43, the evaporator B is electromagnetically made on upto its half way by means of the cam face 28 and the switch $S_1$ and becomes off thereafter, and the damper 10, by the interconnected movement of the cam groove 25, the pin 36, the lever 31, and the connecting member 44, changes its position at $c$ for directing the inlet air to the air-conditioning chamber $C_1$ alone over to a position $d$ to direct the air to the reheating path $C_2$ alone, thereafter moving back again to the position $c$. In the meantime, the water valve 11 repeats "off-on-off" operations by the interconnected movement of the cam groove 26, the pin 37, the lever 32, and the connecting member 45; the damper 12 changes its position at $e$ for passage of the conditioned air to the sides of the outlets 4, 5, and 5$a$ alone over to a position $f$ for passage of the conditioned air to the sides of the outlets 6, 6$a$, and 7 alone by the interconnected movement of the cam groove 27, the pin 38, the lever 33, and the connecting member 46; and the damper 13 electromagnetically changes its position $g$ in the vicinity of the indicator point $j$ by means of the cam face 29 and the switch $S_2$ over to a position $h$ to shut the air flowing toward the outlet 7 for the feet of the riders.

When the controlling lever 14 is shifted toward the opposite direction to the above, i.e., from the position $k$ to the position $i$, the controlling operations proceed in the reversed sequences.

The controlling patterns shown in FIGS. 2($a$) through 9($h$) respectively denote the following characteristics.

1. At the indicator position $i$, where the maximum degree of cooling is necessary, the damper 8 is maintained at its position $a$ to suck only the internal air in the vehicle cabin. 2. At an indicator position between $i$ and $k$, where high degree of cooling is not so much required, the damper shifts a certain extent to introduce the external air into the cabin so as to be mixed properly with the internal air, to avoid contamination within the vehicle cabin, and, simultaneously, to increase the load to the evaporator B to reduce the frequencies of the on-off operations in the thermocouple 9. 3. Distribution of cool and warm air is performed by combined adjustment of the dampers 10 and 12. That is, the cool air from the evaporator B, or passing air introduced from outside through the conduit 1, when the evaporator B is not in operation, is caused to pass as it is into the air-conditioning chamber $C_1$ where it is re-heated in part or in its entirety. Then, of the partly cool air and partly heated air to be mixed in the air-conditioning chamber $C_1$, the cool air in the upper part of the chamber $C_1$ is distributed to the outlets 4, 5, and 5$a$, and the warm air to the outlets 6, 6$a$, and 7.

4. Temperature of the conditioned air is so adjusted that is may assume the curve $l$ for the outlets 4, 5, and 5$a$, the curve $m$ for the outlets 6, 6$a$, and the curve $n$ for the outlet 7.

5. The blowing quantity of the conditioned air to each of the outlets is adjusted in accordance with the curves $l_1$, $m_1$, and $n_1$, i.e., when the conditioned air in the air-conditioning chamber $C_1$ is at a low temperature, more quantity of the conditioned air is blown to the side of the outlets 4, 5, and 5$a$, and when the air is at a high temperature, more quantity of it is blown to the side of the outlet 6, 6$a$, and 7.

Figure 5:
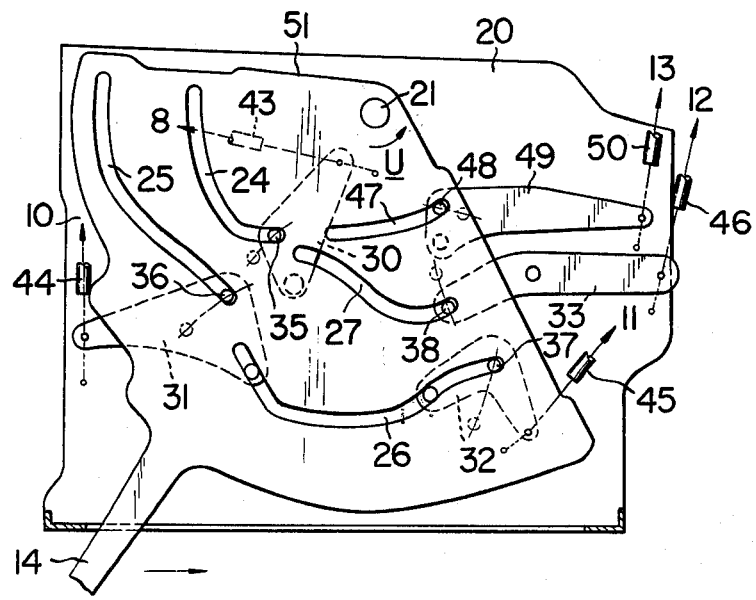
FIG. 5 is a plan view showing another embodiment of the interconnected controlling mechanism according to the present invention.

FIG. 5 shows another embodiment of the present invention, wherein the evaporator B is not used in the control device, or, even if used, the on-off operations of the electic circuit thereof are carried out separately by manual or other appropriate expedients, hence the cam face 28 and the switch $S_1$ in the first-mentioned embodiment is omitted, and the damper 13 is controlled by the interconnected movement of the cam groove 47, the pin 48, the lever 49, and the connecting member 50.

In view of the abovementioned difference in the construction, the shapes of the controlling members such as the cam plate 51, the cam grooves, the levers, etc. are slightly different from those members as shown in FIG. 3 on account of the difference in the positional relationship and the interconnection between the respective controlling members and the members to be controlled (i.e., the dampers 8 to 13), although the inventive concept in both embodiments is one and the same.

While the present invention has been illustrated and described by way of preferred embodiments thereof, it is to be understood that such are merely illustrative and not restrictive, and that variations and modifications may be made therein without departing from the spirit and scope of the present invention. For example, when the external air is being introduced through the first conduit 1, if the air contains appreciable amount of dust and other undesirable substances, the conduit 1 must be closed by the damper 8 to stop suction of the air into the air-conditioning device, for the purpose of which it is desirable that the damper 8 be made operable manually irrespective of the interconnected control mechanism such that a mechanism which can loosen the tension in the connecting member 43 by manual operation be provided on the way of such mechanism. Same can be said of the controlling of the remaining members.

As described in the foregoing, according to the present invention, it becomes possible to control the blowing quantity and temperature of the conditioned air at the outlets to each and every direction in the vehicle cabin by the operation of a single operating lever 14. It is further possible that less amount of the conditioned air is caused to flow from the outlets 4, 5, 5a of the upper direction when the temperature of the conditioned air increases, while more amount of the air is caused to flow when its temperature becomes higher, whereby a condition of "keeping the head cool and the feet warm" can be satisfactorily realized.

What is claimed is:

1. In an air-conditioning device for automotive vehicles, having a first conduit for taking external air into the vehicle cabin; a second conduit for introducing internal air within the vehicle cabin and joined at one open end part thereof with the first conduit; a third conduit connected at one open end part to the conjoined open end of said first and second conduits for conditioning and circulation of sucked air into every part of the vehicle cabin, and having at the other end thereof a plurality of outlets for directing the conditioned air to every part of the vehicle cabin; an air blower, evaporator for cooling, or an and air heater for warming the introduced air, arranged within said third conduit; a change-over damper to selectively introduce the internal and external air into the said air conditioning conduit and provided at the conjoined portion of said first and second conduit; a distributing damper to cause cooled air from said evaporator or the introduced air from both exterior and interior of the vehicle to be directly sent into the air conditioning area, or to pass once through a re-heating area in the vicinity of said air heater; another distributing damper to cause the conditioned air from the air-conditioning area to be divided into said plurality of outlets to the upper and lower parts of the vehicle cabin, still another damper to regulate the blowing quantity of the conditioned air to the outlet for the rider's feet and the outlets for a defroster; a thermocouple to actuate said evaporator; a warm water valve to control feeding of warm water to said air heater, a mechanism for controlling blowing quantity and temperature of the conditioned air characterized by combination of: a base plate for said control mechanism of the air conditioning device; a cam plate pivotally fitted on said base plate and having therein a plurality of engaging grooves; switches positioned so as to be operated by said cam plate; a controlling lever integrally formed with said cam plate at an extension thereof; and a plurality of operating levers, each being slidably engaged with said engaging groove through an engaging pin provided at one end part thereof and having at the other end part thereof means to connect mechanically to said various components to be controlled in said third conduit, said cam plate and said operating levers being mutually interconnected through said cam grooves and said cam plate and said switches being interrelated so as to control flow of the conditioned air in said air conditioning device by shifting said single controlling lever to any required direction in accordance with the purpose of control.

2. A control mechanism for an air conditioning device in automotive vehicles having a main conduit connected to a first conduit for introducing external air into said main conduit and a second conduit for introducing internal air of the vehicle cabin thereinto, an air blower, an evaporator and air heater, arranged in said main conduit, and a plurality of conditioned air outlets to direct conditioned air to the upper and lower parts of the vehicle cabin, a first damper to regulate inlet ratio of external and internal air, a second damper to control amount of air to be sent into a reheating area in the vicinity of said air heater, a third damper to distribute conditioned air into said upper and lower outlets, and a fourth damper to control amount of air to be sent into a defroster outlet, wherein temperature, and blowing quantity of the conditioned air to each said outlets are adjusted by controlling of at least one of said evaporator said and air heater, and said dampers with a single controlling lever integrally formed with a controlling cam mechanism, said cam mechanism having means to operate said evaporator, said air heater and said dampers in an interrelated manner so as to constantly obtain and supply the optimum conditioned air adapted to the desired conditions by said interrelated factors to be controlled.

* * * * *

UNITED STATES PATENT OFFICE
CERTIFICATE OF CORRECTION

Patent No. 3,916,988     Dated November 4, 1975

Inventor(s) Tamotsu Matsuda

It is certified that error appears in the above-identified patent and that said Letters Patent are hereby corrected as shown below:

Column 5, line 43, "or an and air" should be ---and an air---.

Column 6, line 46, "said and air heater," should be ---, said air heater---.

Signed and Sealed this second Day of March 1976

[SEAL]

Attest:

RUTH C. MASON
*Attesting Officer*

C. MARSHALL DANN
*Commissioner of Patents and Trademarks*

UNITED STATES PATENT OFFICE
CERTIFICATE OF CORRECTION

Patent No. 3,916,988　　　　　　　　　Dated November 4, 1975

Inventor(s)　　　　Tamotsu Matsuda

It is certified that error appears in the above-identified patent and that said Letters Patent are hereby corrected as shown below:

Column 5, line 23, "lever 14." should be "lever 14 at the passenger's desire."

Column 5, line 28, "flow when" should be "flow from the outlet 7 when".

Signed and Sealed this

Twelfth Day of October 1976

[SEAL]

Attest:

RUTH C. MASON
*Attesting Officer*

C. MARSHALL DANN
*Commissioner of Patents and Trademarks*